United States Patent [19]

Suzuki

[11] Patent Number: 4,694,983
[45] Date of Patent: Sep. 22, 1987

[54] DEVICE FOR CONTROLLING PINCH ROLLER IN CASSETTE TAPE RECORDER

[75] Inventor: Shoji Suzuki, Iwaki, Japan
[73] Assignee: Alpine Electronics Inc., Japan
[21] Appl. No.: 844,174
[22] Filed: Mar. 26, 1986

[30] Foreign Application Priority Data

Mar. 26, 1985 [JP] Japan .................................. 60-43753

[51] Int. Cl.[4] ..................... B65H 20/40; B65H 23/18; G11B 15/29; G03B 1/32
[52] U.S. Cl. .................................. 226/181; 226/187; 242/209
[58] Field of Search ............... 226/181, 182, 186, 187; 242/206, 209

[56] References Cited

U.S. PATENT DOCUMENTS

| | | | |
|---|---|---|---|
| 3,900,174 | 8/1975 | Morimoto et al. | 242/209 |
| 4,133,012 | 2/1979 | Takamiya et al. | 226/187 X |
| 4,309,731 | 1/1982 | Yoshida et al. | 360/85 |
| 4,342,055 | 7/1982 | Osanai | 242/201 X |

Primary Examiner—John M. Jillions
Assistant Examiner—Steven M. duBois
Attorney, Agent, or Firm—Guy W. Shoup

[57] ABSTRACT

Disclosed is a pinch roller controlling device in a cassette tape recorder, comprising: a chassis; a pinch roller support plate and a control lever respectively pivotally attached with a first and a second support shaft on the chassis at respective intermediate portions of the pinch roller support plate and the control lever; a capstan shaft supported on the chassis; a pinch roller pivotally attached on the pinch roller support plate at one end portion thereof arranged to be movable to advance to/retreat from the capstan shaft; an elongated guide hole formed in said pinch roller support plate at a portion between the one end portion of the pinch roller support plate and the first support shaft; a control plate slidably mounted on the chassis at the side of the second support shaft and formed with a cam hole; a driven pin projectingly provided on the control lever at one end portion thereof and inserted into the cam hole; a connecting plate pivotally attached at one end portion thereof on the control lever at a portion between the one end portion of the control lever and the second support shaft; an engaging pin projectingly provided on the other end portion of the connecting plate and inserted into the elongated guide hole; and a roller urging spring stretched between the other end portion of the pinch roller support plate and the other end portion of the control lever.

2 Claims, 15 Drawing Figures

DEVICE FOR CONTROLLING PINCH ROLLER IN CASSETTE TAPE RECORDER

BACKGROUND OF THE INVENTION

1. Field of the Invention

The present invention relates to a pinch roller controlling device in which a pinch roller is controlled to advance to/retreat from a capstan shaft in a cassette tape recorder.

2. Description of the Prior Art

Generally, in a cassette tape recorder such as a video cassette tape recorder or the like, a tape is sandwiched between a pinch roller and a capstan shaft in playing and is fed in a fixed speed by the capstan shaft. Such a pinch roller is generally pivotally supported on a pinch roller support plate which is in turn pivotally supported on a chassis such that the pinch roller is caused to advance to/retreat from the capstan shaft by operating the pinch roller support plate to swing. The pinch roller is separated from the capstan shaft during the period excepting the time in the course of playing operation.

It may be considered that the above-mentioned swing control of the pinch roller support plate is performed by means of a cam device such as a control plate or the like slidably mounted on the chassis. It is desirable that the swing control of the pinch roller support plate can be performed by a small force without any backlash.

SUMMARY OF THE INVENTION

An object of the present invention is to provide a pinch roller controlling device in a cassette tape recorder, which can satisfy such a requirement as described above.

In order to attain the above object, the pinch roller controlling device according to the present invention comprises: a chassis; a pinch roller support plate and a control lever respectively pivotally attached with a first and a second support shaft on the chassis at respective intermediate portions of the pinch roller support plate and the control lever; a capstan shaft supported on the chassis; a pinch roller pivotally attached on the pinch roller support plate at one end portion thereof arranged to be movable to advance to/retreat from the capstan shaft; an elongated guide hole formed in said pinch roller support plate at a portion between the one end portion of the pinch roller support plate and the first support shaft; a control plate slidably mounted on the chassis at the side of the second support shaft and formed with a cam hole; a driven pin projectingly provided on the control lever at one end portion thereof and inserted into the cam hole; a connecting plate pivotally attached at one end portion thereof on the control lever at a portion between the one end portion of the control lever and the second support shaft; an engaging pin projectingly provided on the other end portion of the connecting plate and inserted into the elongated guide hole; and a roller urging spring stretched between the other end portion of the pinch roller support plate and the other end portion of the control lever.

In such an arrangement, the control lever is operated to rotate by the action of the cam hole and the driven pins when the control plate is moved to advance to/retreat from the second support shaft. Accordingly, the connecting plate moves to advance to/retreat from the pinch roller support plate which is in turn rotated by a spring force of the roller urging spring or an operational force of the control plate to thereby cause the pinch roller to move to advance to/retreat from the capstan shaft.

DESCRIPTION OF THE PREFERRED EMBODIMENT

Figure 1:
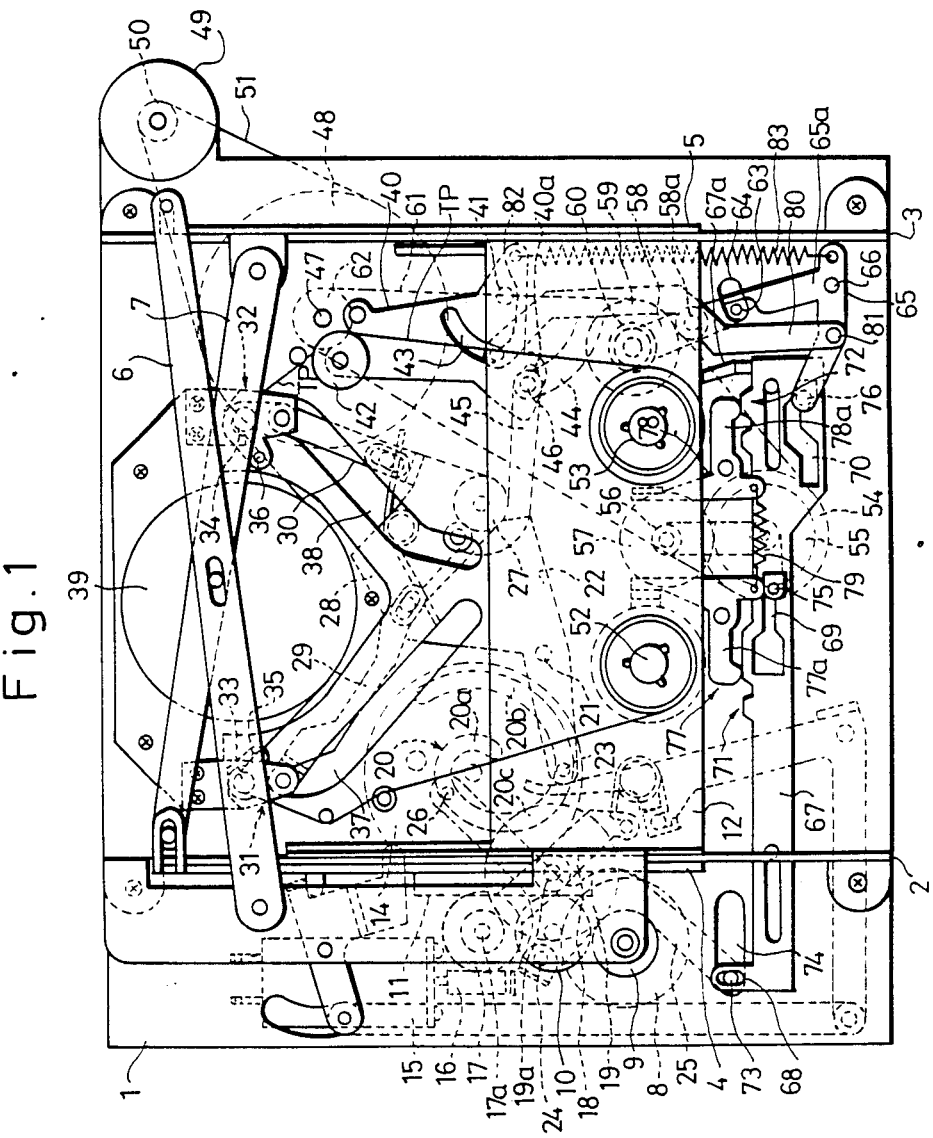
FIG. 1 is a plan view of a video cassette tape recorder showing an arrangement of the pinch roller control device according to the present invention.
Figure 2:
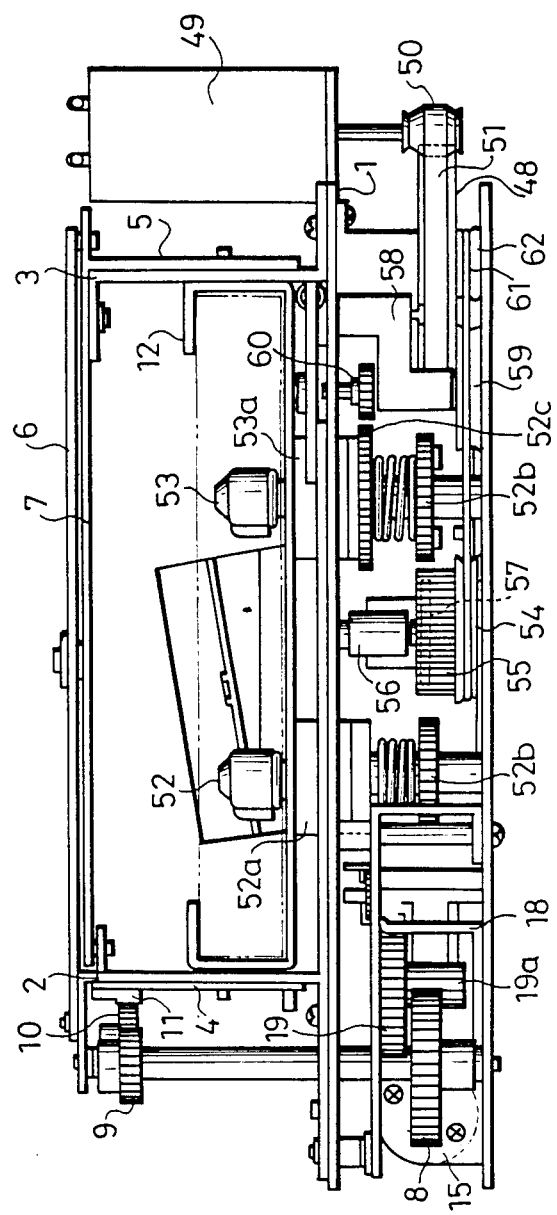
FIG. 2 is a front view of FIG. 1.
Figure 3:
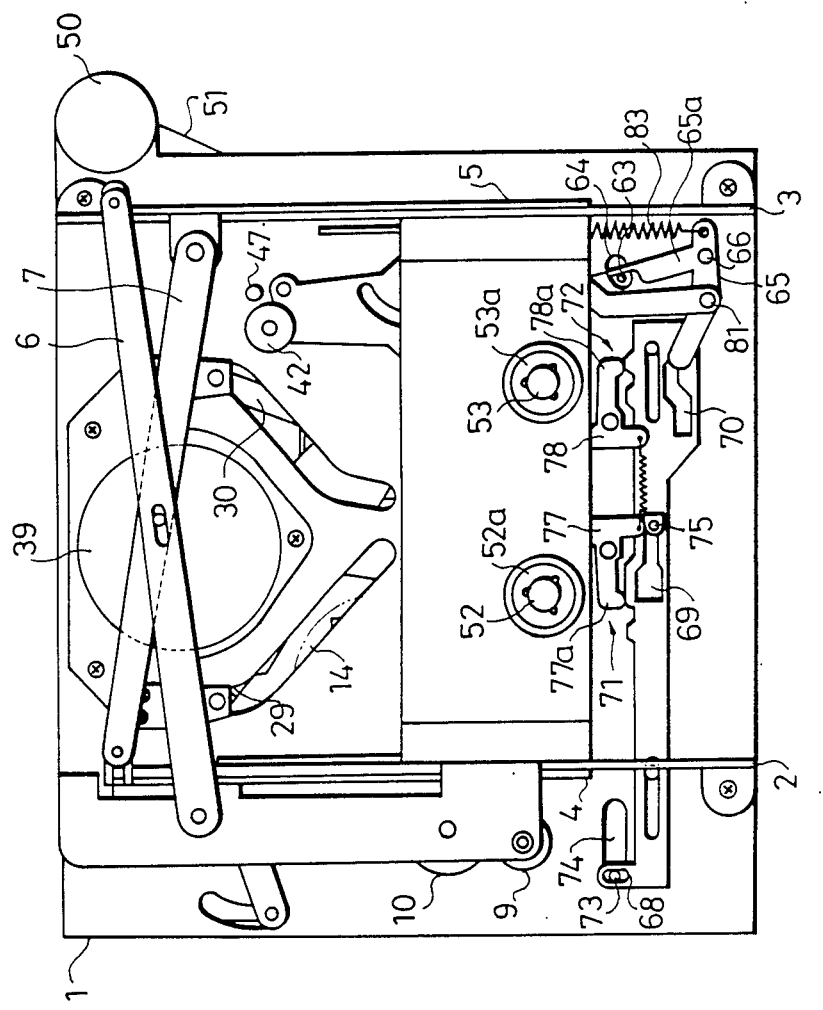
FIG. 3 is a plan view of FIG. 2.
Figure 4:
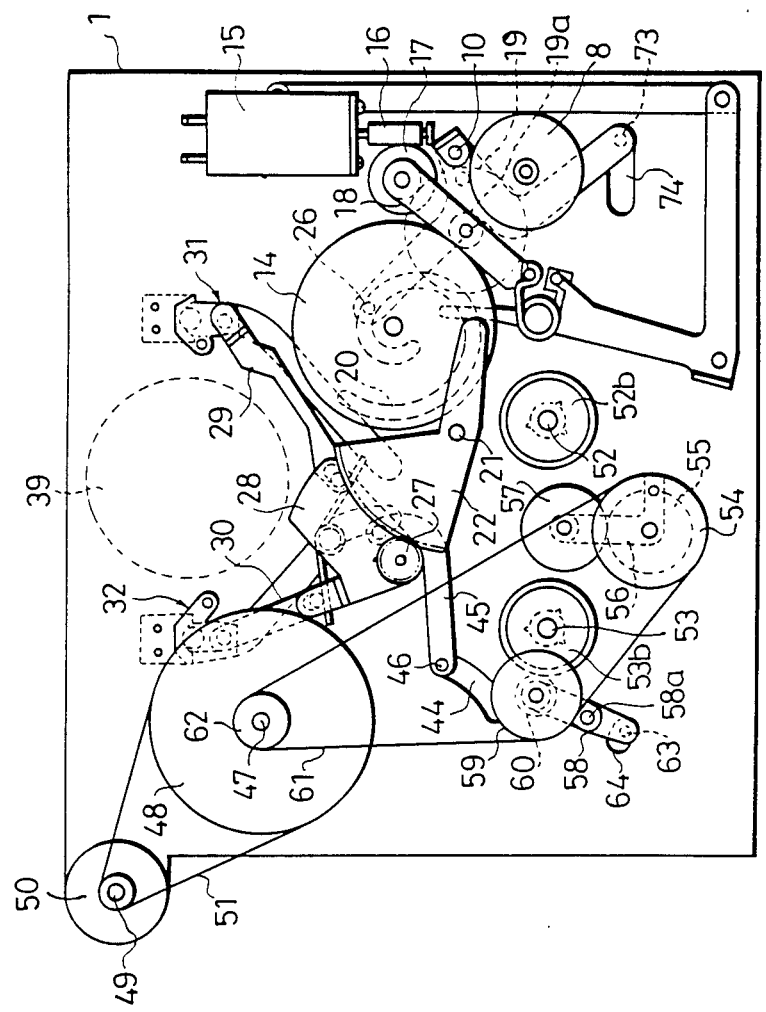
FIG. 4 is a bottom view of FIG. 2 with the lower panel omitted.
Figure 5:
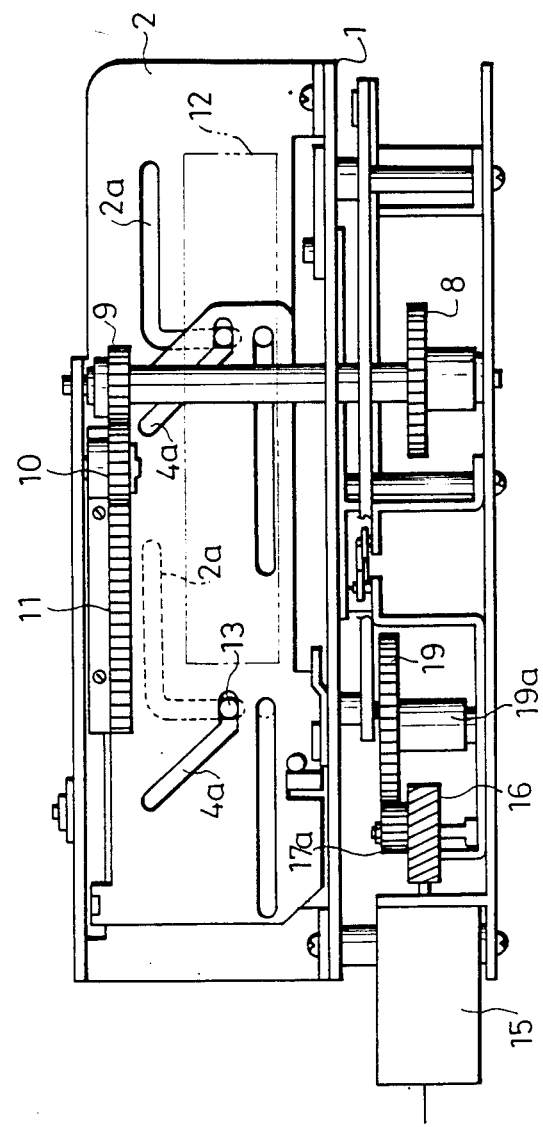
FIG. 5 is a left side view of FIG. 2.

Referring to the drawings, a preferred embodiment of the present invention will be described hereunder.

Figure 6:
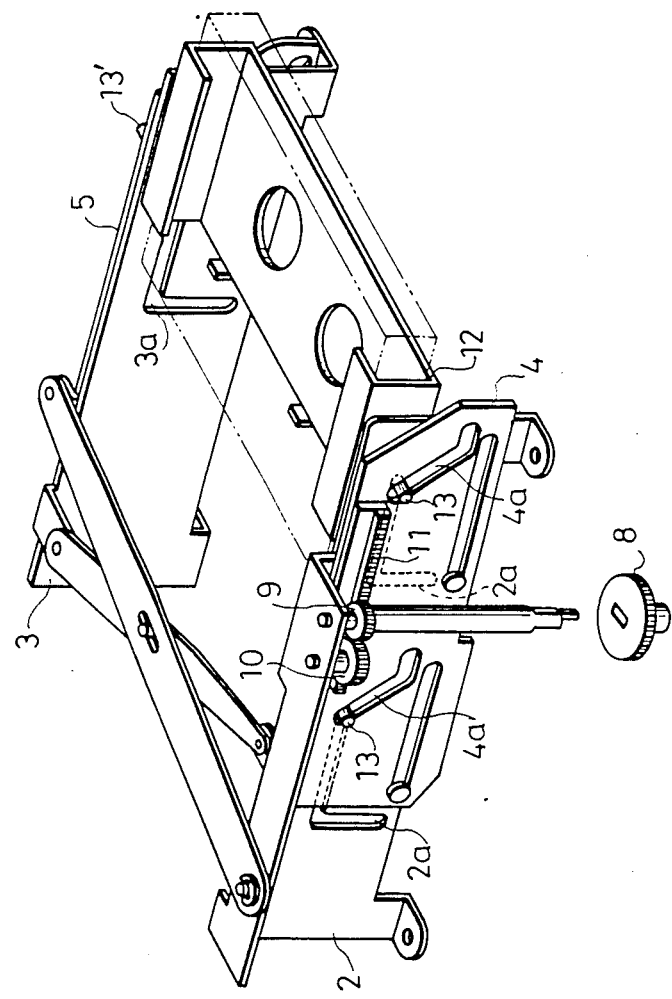
FIG. 6 is a partly exploded perspective view of FIG. 1 with the chassis omitted.

In FIGS. 1 to 5, the reference numeral 1 designates a chassis of a video cassette tape recorder. Side plates 2 and 3 are respectively fixed on the chassis 1 in the vicinity of the opposite sides thereof, and slide plates 4 and 5 are frontward/rearward slidably attached on the outer side portions of the side plates 2 and 3 respectively. The plates 4 and 5 are arranged to be forward/rearward movable integrally with each other through a pair of connecting arms 6 and 7, and arranged to be frontward-/rearward driven through a series of holder elevating/-lowering gears 8, 9, and 10 and a rack 11. A cassette holder 12 (FIG. 6) is disposed between the side plates 2 and 3, and guide pins 13 and 13' provided at the opposite side portions of the cassette holder 12 are respectively inserted through L-shaped guide holes 2a and 3a formed in the side plates 2 and 3 and also through slanting cam holes 4a formed in the slide plates 4 and 5 (the hole formed in the plate 5 being not shown in the drawings). Thus, when the slide plates 4 and 5 are moved frontward/rearward the cassette holder 12 is made to be elevated/lowered.

A cam gear 14 arranged in the vicinity of the gear 8 is pivotally attached on the chassis 1. A worm wheel 17 pivotally attached to the chassis 1 is engaged with a worm 16 of a loading motor 15 fixed to the chassis 1. A gear 19 engaging with a pinion 17a integrated with the worm wheel 17 is pivotally attached to a swing lever 18 rotatably supported coaxially with the warm wheel 17. A changing-over gear 19a is provided integrally on the gear 19. The changing-over gear 19a is arranged between the gear 8 and the cam gear 14 so as to be engaged with selected one the gear 8 and the cam gear 14.

Figure 7:
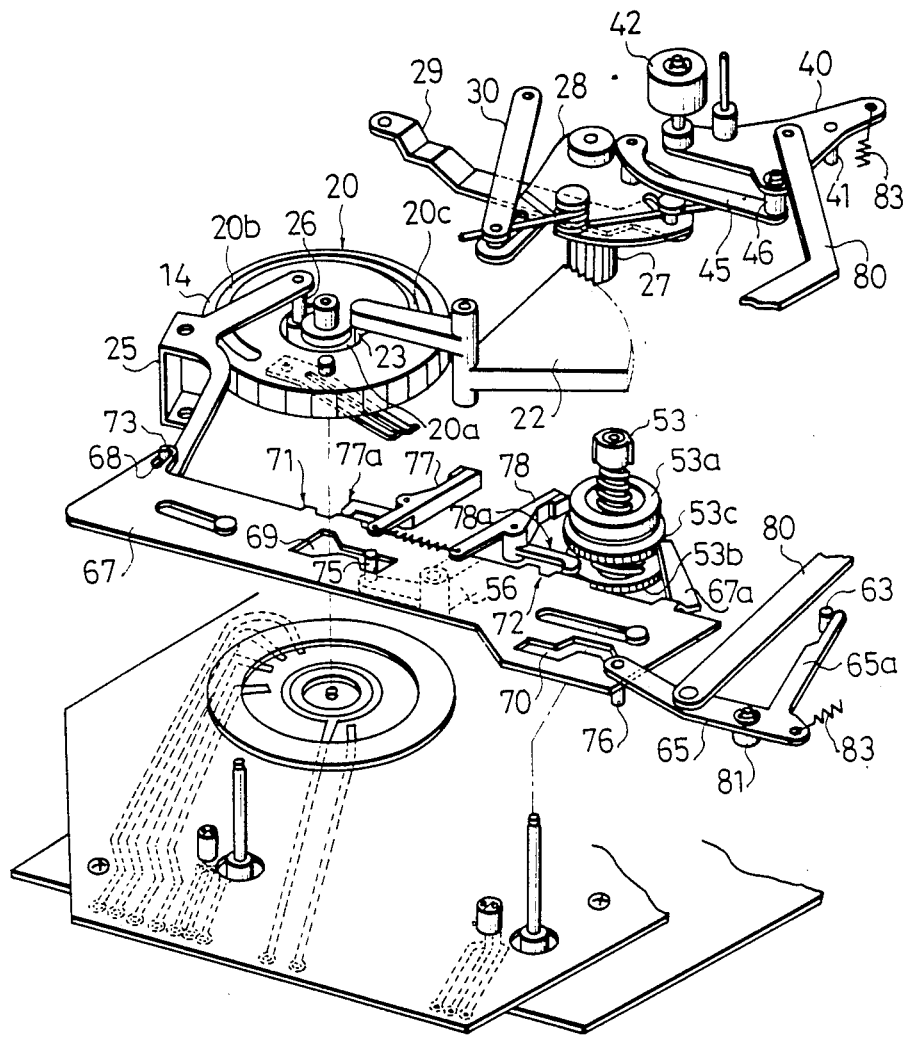
FIG. 7 is an exploded perspective view schematically showing a main portion of FIG. 1.
Figure 8:
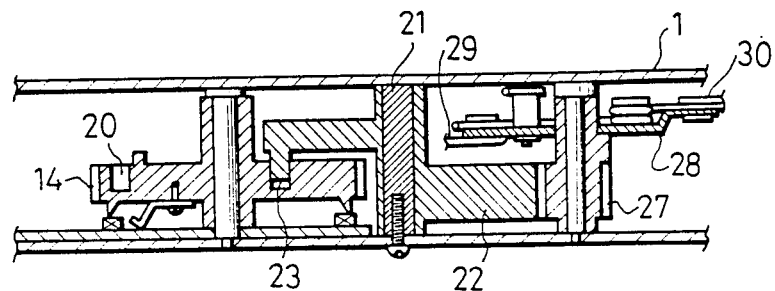
FIG. 8 is a cross-section showing the relationship between the cam gear and the sector gear shown in FIG. 1.

As shown in FIG. 1 and FIG. 7, a spiral cam slot 20 is formed in the above-mentioned cam gear 14. The cam slot 20 is formed by an inner small-diameter concentric circular arc portion 20a, an outer large-diameter concentric circular arc position 20b, and an intermediate cam portion 20c. As shown in FIGS. 7 and 8, an engaging pin 23 of a sector gear 22 pivotally attached onto the chassis 1 with a pivot 21 is inserted into the cam slot 20 into which also an engaging pin 26 of a control plate driving lever 25 pivotally attached to the chassis 1 with a pivot 24 is inserted.

Figure 9:
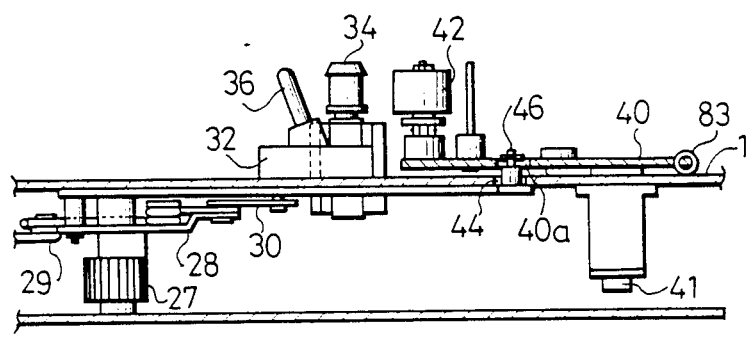
FIG. 9 is a cross-section showing the relationship between the loading block support plate and the pinch roller support plate shown in FIG. 1.
Figure 10:
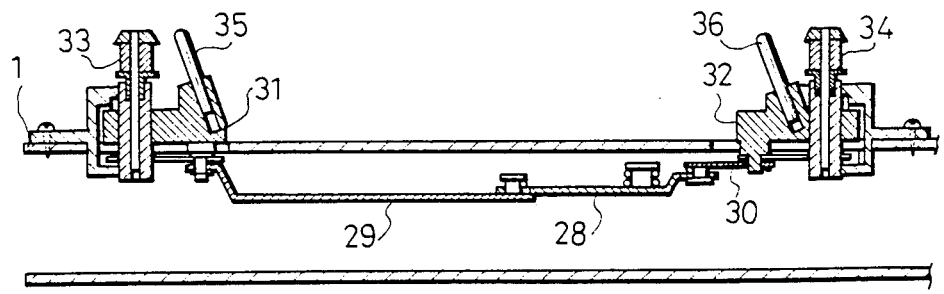
FIG. 10 is a cross-section showing the relationship between the loading block drive plate and the loading block shown in FIG. 1.
Figure 11:
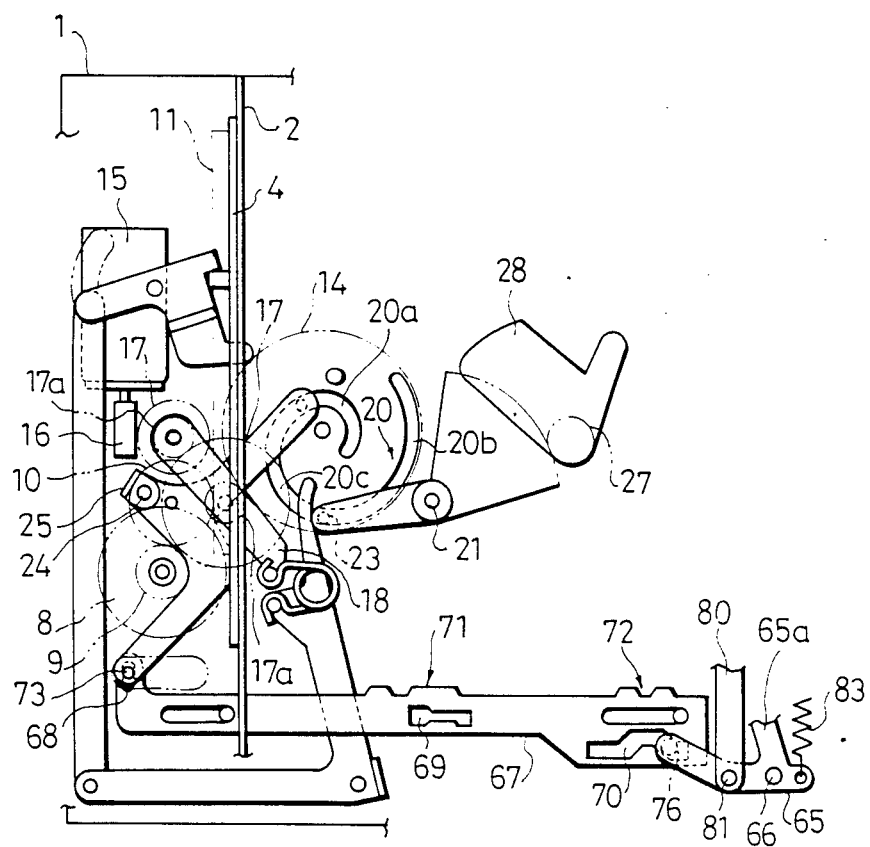
FIG. 11 is an explanatory diagram showing the relationship among the parts around the cam of FIG. 1.

A pinion 27 engaged with the sector gear 22 is pivotally attached to the chassis 1 at the lower portion thereof. As shown in FIGS. 7 to 9, a loading block driving plate 28 is provided integrally with the pinion 27. As shown in FIGS. 1, 7, and 10, loading blocks 31 and 32 are attached to the loading block driving plate 28 through connecting links 29 and 30. Guide rollers 33 and 34 and slanting guide post 35 and 36 are attached to the loading blocks 31 and 32. The loading blocks 31 and 32 are arranged to be movable between the opposite sides of a rotary head 39 along guide holes 37 and 38 in the chassis 1.

A pinch roller support plate 40 is provided above the chassis 1 in the close vicinity of the loading block driving plate 28. The pinch roller support plate 40 is pivotally attached at its intemediate portion onto the chassis 1 by a first support shaft 41. A pinch roller 42 is pivotally attached on the pinch roller support plate 40 at end end portion thereof. A circular arc guide elongated hole 43 is formed in the pinch roller support plate 40 at a portion between its end portion and the first support shaft 41, and a circular arc guide elongated hole 44 is formed in the chassis 1 in the vicinity of the pinch roller support plate 40. A connecting link 45 is pivotally attached at its one end to the loading block driving plate 28 and a connecting shaft 46 inserted in the guide elongated hole 44 is pivotally attached onto the connecting link 45 at its other end. The connecting shaft 46 is inserted in an elongated hole 40a formed at an intermediate portion of the pinch roller support plate 40. When the pinch roller support plate 40 is rotated clockwise about the first support shaft 41, the pinch roller 42 is caused to approach a capstan shaft 47 projected upward from the chassis 1.

The capstan shaft 47 is provided integrally with a fly-wheel 48 which is linked with a driving motor 49 fixed on the chassis 1, through a pulley 50 and a belt 51. The reference numeral 52 designates a supply reel shaft pivotally attached to the chassis 1, 53 a take-up reel shaft pivotally attached to the chassis 1, 54 a drive pulley pivotally attached to the chassis 1 at a position corresponding to a position between the supply real shaft 52 and the take-up reel shaft 53, and 55 a driving gear formed integrally with the driving pulley 54. An intermediate portion of an L-shaped swinging arm 56 is pivotally coaxially attached on the drive gear 55, and an idle gear 57 engaging with the drive gear 55 pivotally attached on the swinging arm 56 at an end portion thereof. The reference numeral 58 designates an arm pivotally attached on the chassis 1 with a pivot 58 in the close vicinity of the take-up reel shaft 53, 59 a pulley pivotally attached on the arm 58 at an end portion thereof, and 60 an idle gear integrally formed with the pulley 59. The pulleys 59 and 54 are interlinked through a belt 61 with a pulley 62 integrally formed with the fly-wheel 48. An engaging pin 63 projectingly provided on the arm at the other end portion thereof is projected upward from the chassis 1 through an elongated hole 64 formed in the chassis 1.

A substantially T-shaped control lever 65 is pivotally attached at its intermediate portion on a second support shaft 66 supported on the chassis 1 at an end portion of the front edge thereof, and a control plate 67 is mounted on the chassis 1 in the vicinity of the front edge portion thereof so as to be movable to advance to/reteat from the second support shaft 66. As shown in FIGS. 1, 3, 7, and 11, an elongated hole 68 extending frontward/rearward is formed in the control plate 67 at its one end portion and an idler control cam hole 69 is formed in the control plate 67 at an intermediate portion thereof. A pinch roller control cam hole 70 is formed in the control plate 67 at its other end portion, the cam hole 70 being bent upward at its intermediate portion in FIG. 1. Brake lever control cams 71 and 72 are formed in the control plate 67 at one side center portion thereof, and a clutch pawl 67a is projectingly provided on the control plate 67 at one side of the other end portion thereof.

An engaging pin 73 of the control plate driving lever 25 is inserted into the elongated hole 68 through an elongated hole 74 formed in the chassis 1, and a driven pin 75 projectingly formed on the swing arm 56 is inserted into the idler controlling cam hole 69. A driven pin 76 projectingly provided the control lever 65 at its one end portion is inserted into the pinch roller controlling cam hole 70. Arm portions 77a and 78a of T-shaped brake lever control cams 77 and 78 pivotally attached on the chassis 1 are made to abut against the brake lever control cams 71 and 72 respectively. A spring 79 is stretched between the respective base end portions of the brake levers 77 and 78, and the respective free ends of the brake levers 77 and 78 are made to face respective reel pedestals 52a and 53a of the supply reel shaft 52 and the take-up reel shaft 53.

A connecting plate 80 is pivotally attached at its one end by a pivot 81 on the connecting lever 63 at a position between its one end portion and the second support shaft 66. An engaging pin 82 is projectingly provided on the connecting plate 80 at its other end portion and inserted into the elongated hole 43 of the pinch roller support plate 40. A roller urging spring f83 is stretched between the other end portion of the pinch roller support plate 40 and the other end portion of the control lever 65. An intermediate arm portion 65a of the control lever 65 abuts against the engaging pin 63.

Next, the operations of the thus arranged pinch roller control device in a cassette tape recorder will be described together with other arrangements and setting conditions.

In the arrangement described above, if the swing lever 18 is rotated towards the cam gear 14, and the loading motor 15 is rotated forward or backward, the rotation of the motor is transmitted to the cam gear 14 through the worm 16, the worm wheel 17, the gear 19, and the change-over gear 19a, so as to rotate the cam gear clockwise or counterclockwise, so that the sector gear 22 is in turn rotated counterclockwise or clockwise about the pivot 21 owing to the action of the cam slot 20 and the engaging pin 23. On the other hand, the control plate driving lever 25 is rotated counterclockwise or clockwise owing to the action of the cam slot 20 and the engaging pin 26. Such rotational operations of the sector gear 22 and the control plate driving lever 25 are alternately performed by the action of the cam slot 20.

Figure 14:
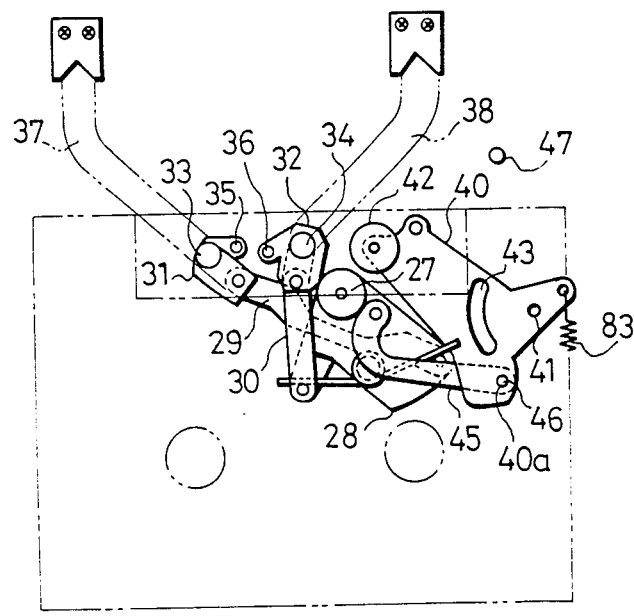
Figure 15:
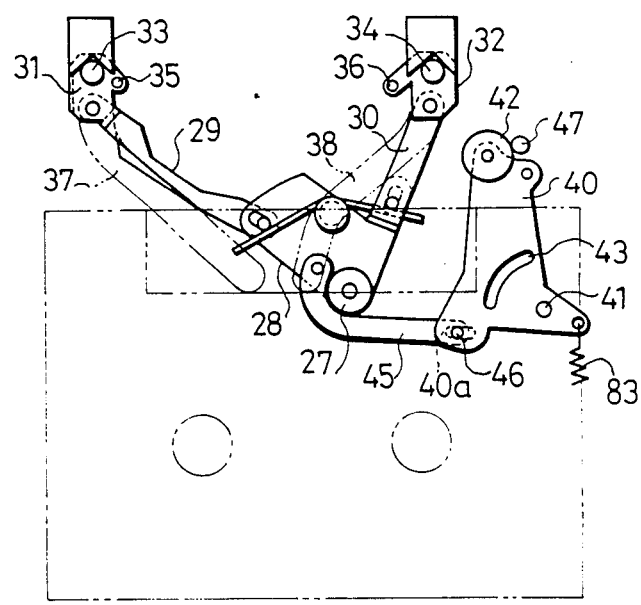

The rotation of the sector gear 22 is transmitted to the loading block driving plate 28 through the pinion 27 and the loading clocks 31 and 32 are advanced to or retreated from the rotary head 39 along the guide holes 37 and 28 (FIGS. 14 and 15). At this time, the pinch roller support plate 40 is also moved clockwise through the connecting link 45.

On the other hand, the rotation of the control plate driving lever 25 is transmitted to the control plate 67 through the elongated hole 68 and the engaging pin 73, and the control plate 67 is slided right or left in FIG. 1.

Figure 12:
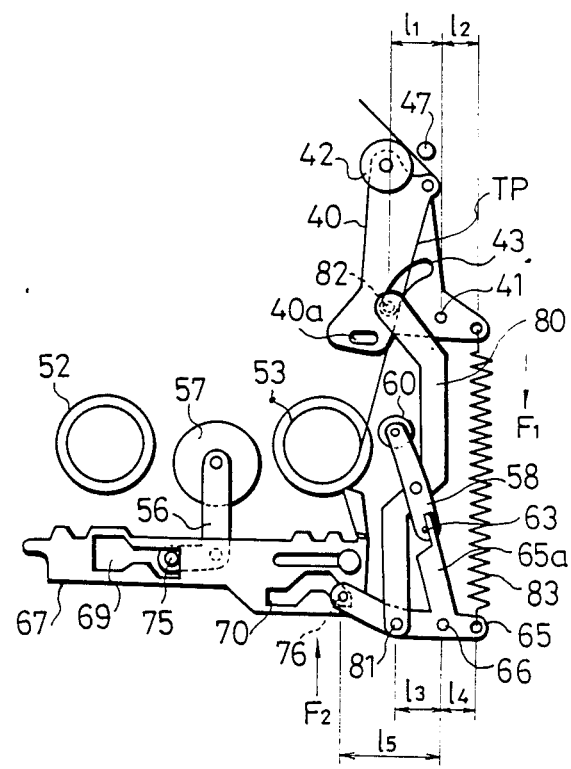
FIGS. 12 and 13 are explanatory diagrams showing the relationships between the control plate and the pinch roller support plate of FIG. 1, and FIGS. 14 and 15 are explanatory diagrams showing the relationships between the pinch roller support plate and the loading block drive plate of FIG. 1.

Owing to this sliding displacement, when the driven pin 76 exists at the right end portion of the pinch roller controlling cam hole 70 as shown in FIG. 12, the driven pin 75 is positioned at the right end portion of the idler controlling cam hole 69. In this position, the downward movement of the driven pin 75 is not limited, while the upward movement of the same is limited. Accordingly, the swing arm 56 can not rotate left while can rotate right, so that the idle gear 57 can not engage with a reel gear 52b of the supply reel shaft 52 while can engage with a reel gear 53b of the take-up reel shaft 53. Besides, in this position, the idler gear 60 of the arm 58 is separated from a clutch 53c of the take-up reel shaft 53, because the intermediate arm portion 65a of the control lever 65 urges the engaging pin 63 of the arm 58 against the elastic force of the belt 61.

Figure 13:
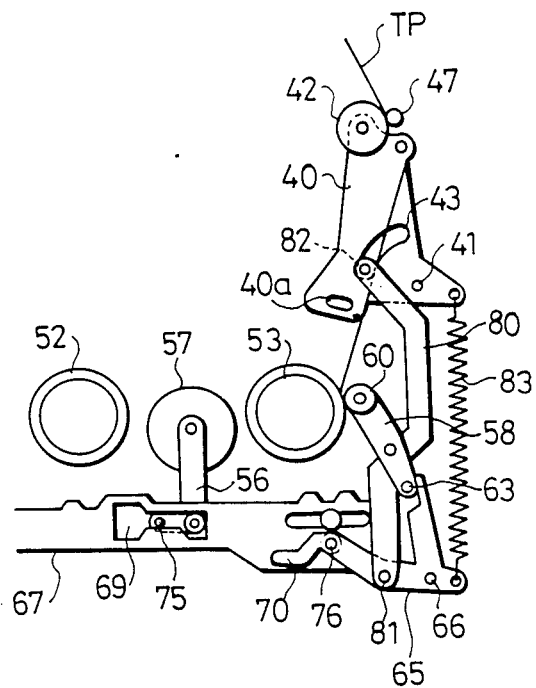

If the control plate 67 is moved right from the above-mentioned position so that the driven pin 76 is moved to the top portion of the center bent portion of the pinch roller controlling cam hole 70 as shown in FIG. 13, the control lever 65 is rotated clockwise about the second support shaft 66 against spring force of the roller urging spring 83. Accordingly, the urging force of the intermediate arm portion 65a of the control lever 65 acting on the engaging pin 63 is released so that the arm 58 is rotated toward the clutch gear 53c by the elastic force of the belt 61 to cause the idle gear 60 to engage with the clutch gear 53c. At this time, the connecting plate 80 is displaced upward to rotate the pinch roller support plate 40 clockwise about the first support shaft 41 by the spring force of the spring 83, and the pinch roller 42 makes a tape TP contact with the capstan shaft 47. In this position, the vertical movement of the driven pin 76 is limited by the action of a thin portion of the idler controlling cam hole 70, so that the idle gear 57 is in a neutral position relative to the reel gears 52b and 53b.

Further, when the control plate 67 is displaced right and the driven pin 76 is moved to the left end portion of the pinch roller controlling cam hole 70, the control lever 65 is rotated counterclockwise about the second support shaft 66 by the spring force of the spring 83. Accordingly, the connecting plate 80 is moved down in FIG. 1 so that the pinch roller support plate 40 is rotated counterclockwise about the first support shaft 41 and the pinch roller 42 is separated from the capstan shaft 47. In this position, the driven pin 75 is displaced into a wide portion of the idler controlling cam hole 69 so that the driven pin 75 is enabled to be moved vertically. Therefore, the swing arm 56 is rotated right or left depending on the rotational direction of the driving gear 55 to cause the idle gear 57 to engage with the reel gear 52b or 53b, so that rewinding or fast feeding of the tape TP is performed.

In the above-mentioned arrangement, as shown in FIG. 12, let the length from the first support shaft 41 of the pinch roller support plate 40 to the engaging pin 82 be represented by $l_1$, and the length from the first support shaft 41 of the pinch roller support plate 40 to the attached portion of the spring 83 on the pinch roller support plate 40 be represented by $l_2$. Further, let the length from the second support shaft 66 of the control lever 65 to the pivot 81 be represented by $l_3$, the length from the second support shaft 66 of the control lever 65 to the attached portion of the spring 83 be represented by $l_4$, and the length from the second support shaft 66 to the driven pin 76 be represented by $l_5$. Furthermore, let the spring force of the roller urging spring 83 be represented by $F_1$, and the pressing force of the driven pin 76 applied to the pinch roller controlling cam hole 70 be represented by $F_2$. Then the polarity of force is defined to be positive and negative when the force directs upward and downward respectively. Under the conditions, the urging force $F_2$ can be expressed by the following equation if the elastic force of the belt 61 acting on the intermediate arm portion 65a through the pulley 59, the arm 58, and the engaging pin 63:

$$F_2 = \frac{(l_2/l_1) \cdot l_3 - l_4}{l_5} \cdot F_1 \quad (1)$$

Here, in the case where one end portion of the roller urging spring 83 is attached not to the control lever 65 but to the chassis 1, the urging force $F_2'$ is expressed by $$F_2' = \frac{(l_2/l_1) \cdot l_3}{l_5} \cdot F_1 \quad (2)$$

Therefore, if we assume $l_1 = l_2$, $l_3 = 2l_4$, then, $$F_2 = (l_4/l_5) \cdot F_1 \quad (3)$$

$$F_2' = 2(l_4/l_5) \cdot F_1 \quad (4)$$

Thus, the urging force of the driven pin 76 acting on the pinch roller controlling cam hole 70 in the case of the present embodiment becomes a half of that in the case where the end portion of the spring 83 is attached onto the chassis 1.

When the pinch roller 42 is attached to the capstan shaft 47, $$F_2 = -(l_4/l_5) \cdot F_1 \quad (5)$$

$$F_2 40 = 0 \quad (6)$$

Thus, although the urging force becomes reversed, the urging force $F_2$ never increase urgently as a whole. As the result, the urging force of the driven pin 76 acting onto the pinch roller controlling cam hole 76 becomes light on an average, so that the control plate 67 can be slide smoothly right/left.

The pinch roller controlling device according to the present invention is arranged in such a manner as described above, and therefore advantageous in that the sliding operation of the control plate can be performed always with a small force and the rotation control operation for the pinch roller support plate can be performed with a small force with no backlash.

What is claimed is:
1. In a cassette tape recorder, a pinch roller controlling device comprising:
  a chassis;

a pinch roller support plate and a control lever respectively pivotally attached with a first and a second support shaft on said chassis at respective intermediate portions of said pinch roller support plate and said control lever;

a capstan shaft supported on said chassis;

a pinch roller pivotally attached on said pinch roller support plate at one end portion thereof arranged to be movable to advance to/retreat from said capstan shaft;

an elongated guide hole formed in said pinch roller support plate at a portion between said one end portion of said pinch roller support plate and said first support shaft;

a control plate slidably mounted on said chassis at the side of said second support shaft and formed with a cam hole;

a driven pin projectingly provided on said control lever at one end portion thereof and inserted into said cam hole;

a connecting plate pivotally attached at one end portion thereof on said control lever at a portion between said one end portion of said control lever and said second support shaft;

an engaging pin projectingly provided on the other end portion of said connecting plate and inserted into said elongated guide hole; and a roller urging spring stretched between the other end portion of said pinch roller support plate and the other end portion of said control lever.

2. A pinch roller controlling device according to claim 1, in which said elongated guide of said pinch roller support plate is shaped in a form of circular arc, and said cam hole of said control plate is shaped to be elongated and have a bent portion projected generally toward said pinch roller support plate.

* * * * *